United States Patent
Katsuda et al.

(10) Patent No.: US 10,712,447 B2
(45) Date of Patent: Jul. 14, 2020

(54) WIRELESS DEVICE HAVING LOW SUSCEPTIBILITY TO STATIC ELECTRICITY

(71) Applicant: CASIO COMPUTER CO., LTD., Tokyo (JP)

(72) Inventors: Hiroshi Katsuda, Kodaira (JP); Akira Suzuki, Fuchu (JP); Akihisa Ohmura, Hachioji (JP); Hiroki Nishiyama, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 349 days.

(21) Appl. No.: 15/882,061

(22) Filed: Jan. 29, 2018

(65) Prior Publication Data

US 2018/0224556 A1     Aug. 9, 2018

(30) Foreign Application Priority Data

Feb. 6, 2017    (JP) .................................. 2017-019386

(51) Int. Cl.
| | | |
|---|---|---|
| *H01T 23/00* | (2006.01) | |
| *G01S 19/21* | (2010.01) | |
| *G01S 19/42* | (2010.01) | |
| *H01Q 1/27* | (2006.01) | |
| *H01Q 1/48* | (2006.01) | |
| *G01S 19/35* | (2010.01) | |
| *H01Q 9/42* | (2006.01) | |

(52) U.S. Cl.
CPC .............. *G01S 19/21* (2013.01); *G01S 19/35* (2013.01); *G01S 19/42* (2013.01); *H01Q 1/273* (2013.01); *H01Q 1/48* (2013.01); *H01Q 9/42* (2013.01)

(58) Field of Classification Search
None
See application file for complete search history.

(56) References Cited

U.S. PATENT DOCUMENTS

| 6,243,592 B1 * | 6/2001 | Nakada ................. | H01Q 1/243 455/575.7 |
|---|---|---|---|
| 7,256,697 B2 * | 8/2007 | Sakama ................ | G06K 19/04 340/572.1 |
| 10,386,790 B2 * | 8/2019 | Katsuda ................. | G04B 37/08 |

FOREIGN PATENT DOCUMENTS

| JP | 2000-59241 A | 2/2000 |
|---|---|---|
| JP | 2008-011116 A | 1/2008 |

(Continued)

OTHER PUBLICATIONS

JPO; Application No. 2017-019386; Notification of Refusal dated Dec. 11, 2018.

*Primary Examiner* — Stephen W Jackson
(74) *Attorney, Agent, or Firm* — Fitch, Even, Tabin & Flannery LLP

(57) ABSTRACT

A wireless device includes a circuit board, a communicator disposed on the circuit board, and a casing accommodating the circuit board and the communicator. The casing has a through-hole in a side face. An antenna element is disposed on the exterior of the casing. A feeder extends through the through-hole in the casing and feeds electrical power from the communicator to the antenna element at a predetermined feeding position. A ground terminal extends through the through-hole in the casing and electrically connects the circuit board to the antenna element at a ground position of the antenna element at a predetermined distance from the feeding position.

8 Claims, 3 Drawing Sheets

(56) References Cited

FOREIGN PATENT DOCUMENTS

JP 2010-154221 A 7/2010
JP 2011-135249 A 7/2011

* cited by examiner

WIRELESS DEVICE HAVING LOW SUSCEPTIBILITY TO STATIC ELECTRICITY

CROSS-REFERENCE TO RELATED APPLICATION

This application is based upon and claims the benefit of priority from the prior Japanese Patent Application No. 2017-019386, filed on Feb. 6, 2017, the entire contents of which are incorporated herein by reference.

BACKGROUND OF THE INVENTION

1. Field of the Invention

The present invention relates to a wireless device having low susceptibility to static electricity.

2. Description of Related Art

Portable electronic devices or wireless devices, such as electronic watches wearable on bodies, such as on arms, can receive radio waves from satellites of positioning systems, such as a U.S. global positioning system, to acquire information on position, date, and time. Such a wireless device includes an antenna for reception of radio waves.

The antenna of the wireless device should have reduced dimensions in proportion to the dimensions of the wireless device. Unfortunately, the antenna disposed inside the casing of the wireless device often has a low reception level of radio waves due to the influence of the casing and components. Japanese Patent Application Laid-Open Publication No. 2000-59241 discloses a technique for feeding electric power to an arcuate antenna surrounding a display screen on the exterior of a casing through an insertion hole in the casing, to receive signals.

SUMMARY OF THE INVENTION

According to an aspect of the present invention, there is provided a wireless device including:
a circuit board;
a communicator disposed on the circuit board;
a casing accommodating the circuit board and the communicator and having a through-hole in a side face;
an antenna element disposed on the exterior of the casing;
a feeder extending through the through-hole in the casing and feeding electrical power from the communicator to the antenna element at a predetermined feeding position; and
a ground terminal extending through the through-hole in the casing and electrically connecting the circuit board to the antenna element at a ground position of the antenna element at a predetermined distance from the feeding position.

DETAILED DESCRIPTION OF THE PREFERRED EMBODIMENTS

Embodiments of the present invention will now be described with reference to the accompanying drawings.

Figure 1:
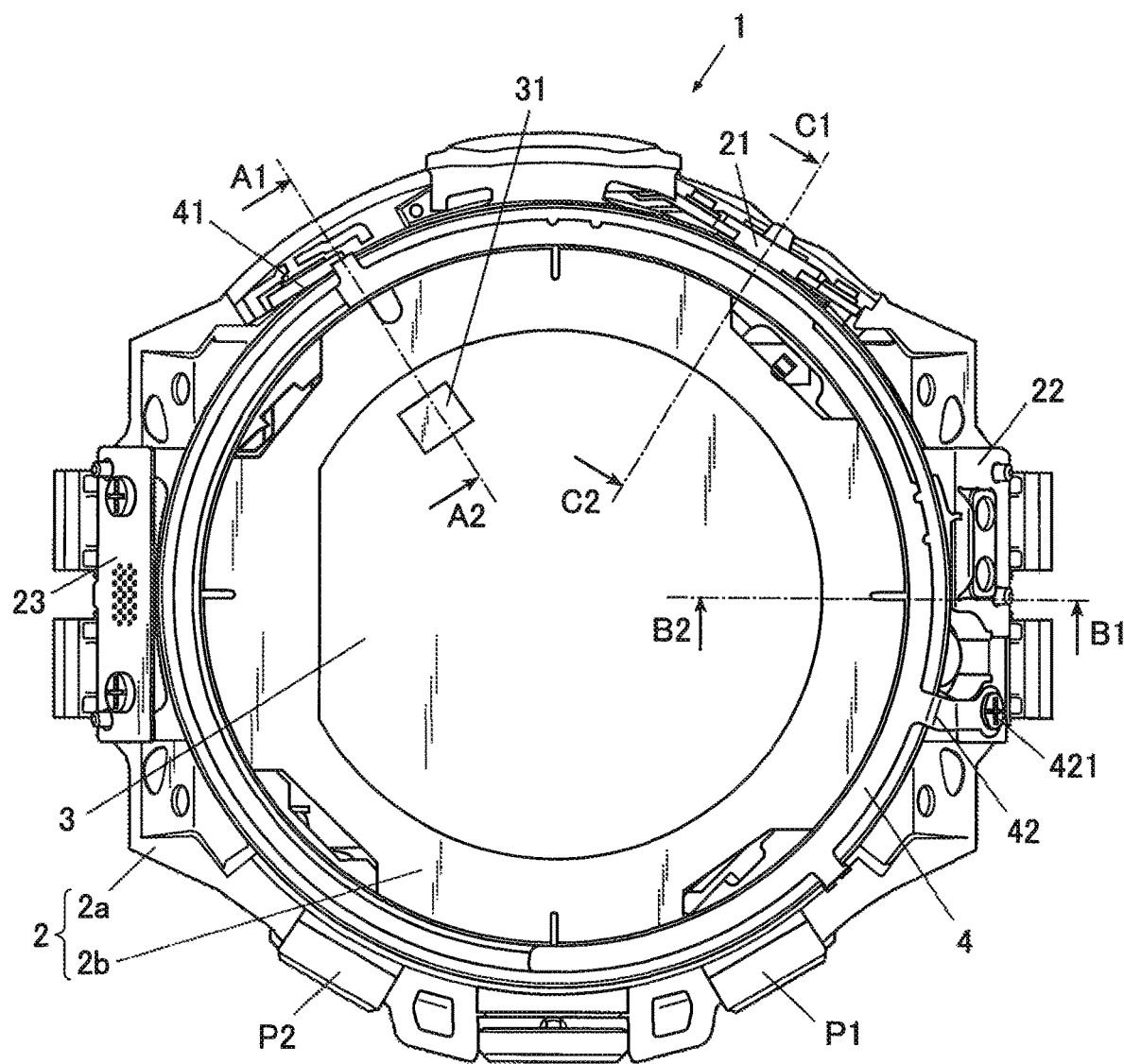
FIG. 1 illustrates the configuration of a wireless device according to an embodiment of the present invention.

FIG. 1 illustrates the configuration of a wireless device according to an embodiment of the present invention.

The wireless device 1 is a wearable terminal or smart watch worn around the arm and has a display on the front face. FIG. 1 is a front view of the interior of the wireless device 1 without a cover 5, a touch panel 6, and a display 7 (see FIGS. 2A and 2B). Some of the components irrelevant to the present invention are not depicted.

The wireless device 1 includes a casing 2, a circuit board 3, push-button switches P1 and P2, and an antenna element 4.

The casing 2 accommodates the circuit board 3, the touch panel 6, and the display 7. The casing 2 includes a side segment 2a having an annular inner face and a rear cover 2b fixed to the side segment 2a with screws to seal one opening of the side segment 2a (in the back of FIG. 1). The other opening of the side segment 2a (in the front of FIG. 1) is sealed with the transparent cover 5 to encapsulate the circuit board 3, the touch panel 6, and the display 7. The side segment 2a is composed of an insulating material, such as resin, and the rear cover 2b is composed of a conductive material. The side segment 2a and the rear cover 2b maybe composed of any other materials. The casing 2 and the cover 5 have a sealing structure (waterproof structure), for example, a gasket 25 (see FIG. 2B) that prevents intrusion of water or moisture with a predetermined pressure or higher into the casing 2.

The two push-button switches P1 and P2 are disposed on the side face of the casing 2 at the bottom in FIG. 1. Pressing the push-button switch P1 or P2 toward the interior of the casing 2 causes operational signals to be transmitted to a controller (not shown) disposed on the circuit board 3. The side segment 2a of the casing 2 includes band attachments on the left and right in FIG. 1 to fix bands to be worn around an arm of a user. Metal segments 22 and 23 are disposed adjacent to the respective band attachments on the exterior of the casing 2. The side segment 2a may further include any assembly component and additional component for design.

The circuit board 3 includes various electronic parts and circuits involved in the operation of the wireless device 1. The electronic parts include an IC chip involved in a communicator 31 (satellite-wave receiver) that receives radio waves from positioning satellites and the controller described above. A power supply and a battery 8 (rechargeable battery in this embodiment) supplying electrical power to the components are disposed near the circuit board 3. The various electronic parts including the communicator 31, the circuits, the power supply, and the battery 8 are connected to an appropriate signal patterns (signal lines) corresponding to a source pattern (source lines) and a ground pattern (GND lines) and so on, in the circuit board 3.

A charging terminal 21 is disposed on the side face of the casing 2. The charging terminal 21 is connected to an external power source via a predetermined cable and receives electrical power from the external power source, to charge the battery 8 of the power supply that supplies electrical power to the various components including the communicator 31.

The antenna element 4 is a curved conductive member arcuately surrounding the exterior of the casing 2 along the surface of the side segment 2a of the casing 2. In the case where the side segment 2a is composed of a conductive material, the antenna element 4 is insulated from the side segment 2a with an insulating sheet disposed therebetween. The antenna element 4 is provided for reception of radio waves from positioning satellites by the communicator 31. In specific, the length of the antenna element 4 is determined in accordance with the frequency of the radio waves from the positioning satellites, which is in the L1 band (1.57542 GHz for GPS satellites) in this embodiment.

The antenna element 4 has a feeding point (feeding position) at one end that receives an appropriate level of electrical power from the communicator 31 disposed on the circuit board 3. Aground edge 42 (ground position) is disposed on the antenna element 4 at a predetermined distance from the feeding point and overlaps with the metal member 22. The ground edge 42 is fixed to the metal member 22 with a screw 421. The distance between the feeding point and the ground edge 42 is determined to achieve satisfactory sensitivity to the wavelength of the received radio waves.

Figure 2A:
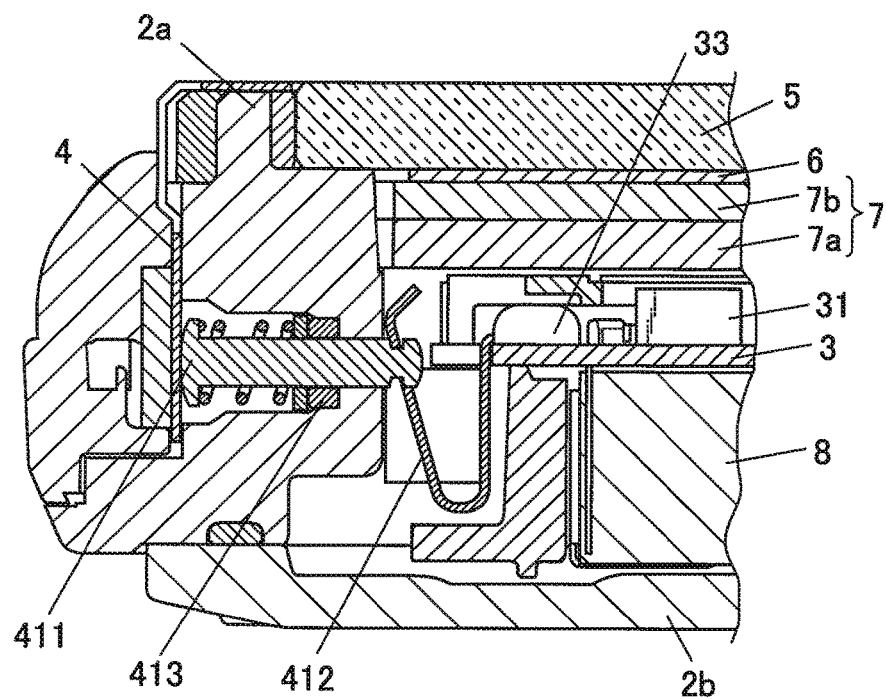
FIG. 2A is a partial cross-sectional view of the wireless device.
Figure 2B:
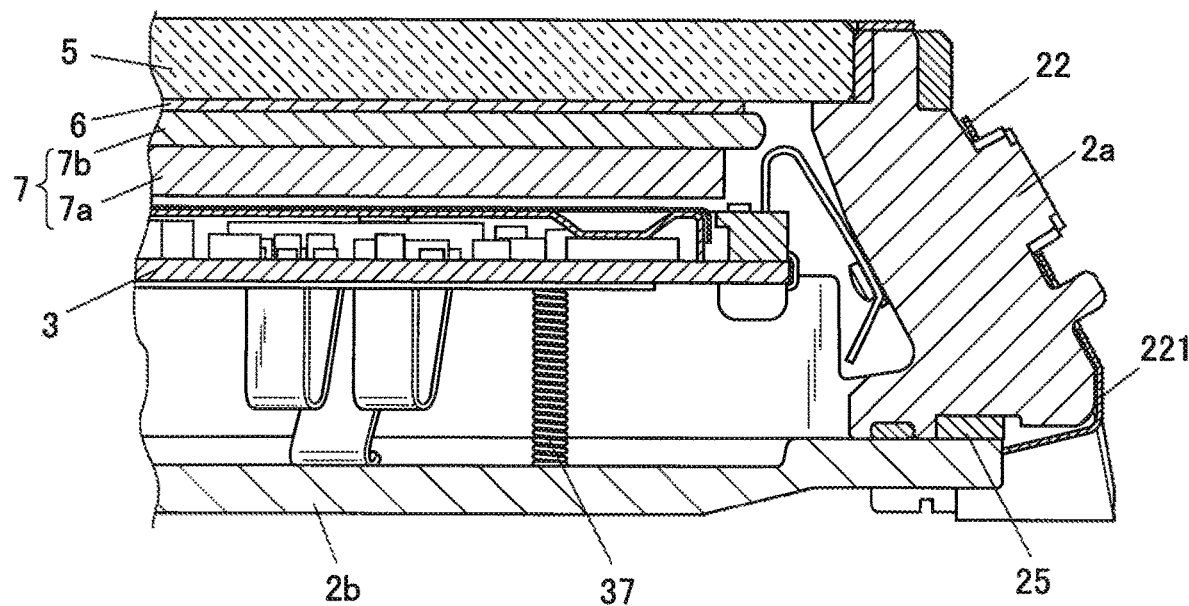
FIG. 2B is a partial cross-sectional view of the wireless device.

FIG. 2A is a partial cross-sectional view of the wireless device 1 taken along line A1-A2 in FIG. 1. FIG. 2B is a partial cross-sectional view of the wireless device 1 taken along line B1-B2 in FIG. 1.

The cross-section A1-A2 in FIG. 2A illustrates the communicator 31 and one end of the antenna element 4. The communicator 31 feeds electrical power to the antenna element 4 in this cross-section. As described above, the rear cover 2b seals one face or the bottom face of the side segment 2a. The circuit board 3, the display 7, and the touch panel 6, are stacked in this order. The upper face of the side segment 2a is covered with the cover 5. The cover 5 and the touch panel 6 are composed of a transparent material transmitting the images appearing on the display 7 such that the user can view the image from outside.

The display 7 includes a backlight unit 7a and a liquid-crystal display screen 7b. The light from the backlight unit 7a selectively passes through the liquid-crystal display screen 7b in accordance with the deflection of each pixel, passes through the touch panel 6 and the cover 5, and radiates from the display 7, to form an image.

The touch panel 6 detects a contact state (position or movement) of the user to the cover 5 and outputs the result to the controller of the circuit board 3. The detection of contact of the touch panel 6 may achieved through any known scheme, such as infrared, static electricity, or pressure detection. The cover 5 should be composed of a material and disposed in an attached state that transmit a contact operation to the touch panel 6.

The feeding terminal of the antenna element 4 is in contact with a feeder 41 that extends through the side segment 2a of the casing 2 and is connected to the communicator 31. In detail, the feeder 41 includes a feeding pin 411 and a flat spring 412. The feeding pin 411 extends along a first through-hole in the side segment 2a of the casing 2 and is connected to the communicator 31. The casing 2 accommodates the flat spring 412 having one end soldered to the circuit board 3 with solder 33 and the other end fixed to the feeding pin 411. In detail, the antenna element 4 is connected to the communicator 31 via the feeding pin 411 and the flat spring 412 to receive electrical power. The radio signals received at the antenna element 4 are transmitted to the communicator 31 via the feeding pin 411 and the flat spring 412. The interior and the inner faces of the casing 2 along which the feeding pin 411 extends are filled or lined with a waterproof member 413, such as resin or an annular gasket, to maintain a waterproof state.

The cross-section B1-B2 in FIG. 2B includes the metal member 22.

The metal member 22 is fixed to one end of a flat spring 221. The other end of the flat spring 221 is in contact with the rear cover 2b. The rear cover 2b is electrically connected to the circuit board 3 via a coil spring 37. The coil spring 37 under no tension has a length larger than the distance between the circuit board 3 and the rear cover 2b in a fixed state. One end of the coil spring 37 is bonded to the circuit board 3. Fixing the rear cover 2b causes the other end of the coil spring 37 to meet the rear cover 2b, and the coil spring 37 enters a compressed state. The coil spring 37 in this state electrically connects the circuit board 3 to the rear cover 2b. As a result, the metal member 22 is grounded to the substrate via the flat spring 221, the rear cover 2b, and the coil spring 37.

Since the coil spring 37 is not fixed to the rear cover 2b, the expanded and compressed states of the coil spring 37 and the contact state of the coil spring 37 to the rear cover 2b may vary depending on the movement of the wireless device 1 or user. This is likely to cause instable electrical resistance in the grounding path from the metal member 22 to the circuit board 3. The rear cover 2b should have high durability because a large area of it is exposed to the exterior and comes into contact with the body of the user. Thus, a material having low electrical resistance is not suitable for the rear cover 2b. Consequently, the electrical resistance (impedance) of the grounding path may be high and instable.

In addition to this grounding path, the wireless device 1 according to this embodiment is provided with another grounding path that is stable and has low resistive loss.

Figure 3A:
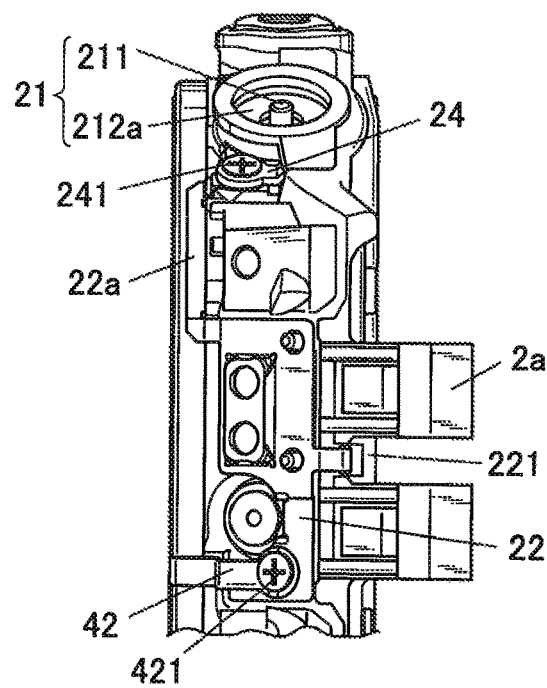
FIG. 3A illustrates the ground structure of an antenna element.
Figure 3B:
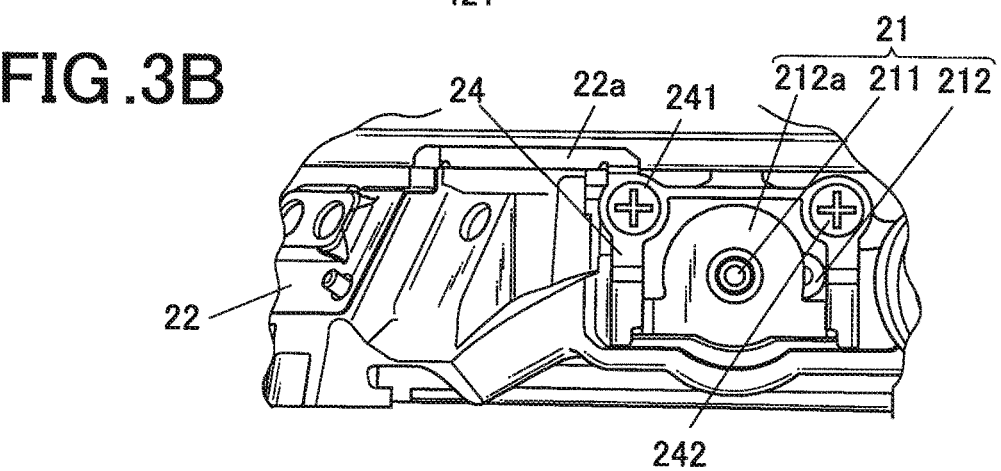
FIG. 3B illustrates the ground structure of the antenna element.
Figure 3C:
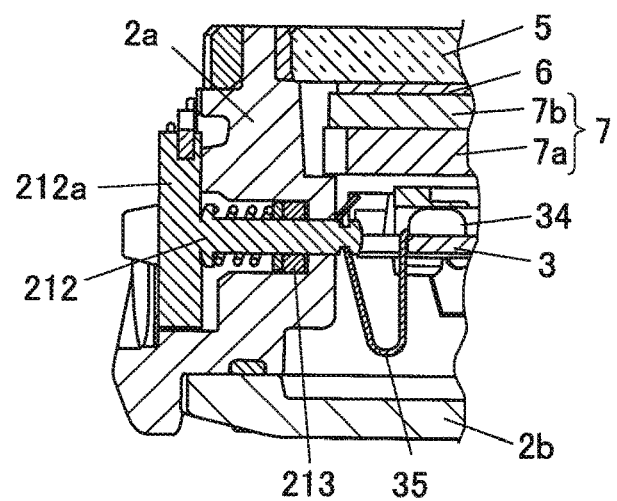
FIG. 3C illustrates the ground structure of the antenna element.

FIGS. 3A to 3C illustrate the ground structure of the antenna element 4 of the wireless device 1 according to this embodiment.

FIG. 3A illustrates a portion of the side face of the casing 2 viewed from the position B1 of the cross-sectional line B1-B2 in FIG. 1. FIG. 3B illustrates a portion of the side face of the casing 2 viewed from the position C1 of the cross-sectional line C1-C2 in FIG. 1. FIG. 3C is a cross-sectional view along line C1-C2 in FIG. 1.

The metal member 22 connected to the ground edge 42 of the antenna element 4 has an arm 22a extending toward the charging terminal 21. The arm 22a is in contact with and fixed to a conductive member 24 with a screw 241. The conductive member 24 is fixed and connected to the charging terminal 21 with the screw 241 and another screw 242. In specific, the metal member 22 and the conductive member 24 are connectors to the charging terminal 21.

The cross-sectional line C1-C2 in FIG. 1 relevant to FIGS. 3B and 3C intersects the charging terminal 21. The charging terminal 21 includes two columnar members or pins extending through the casing 2: a central pin 211 and a ground pin 212 (ground voltage feeding path). These columnar members receive a predetermined voltage and a ground voltage, respectively. In detail, the central pin 211 and the ground pin 212 extend through a second through-hole in the side segment 2a of the casing 2 and are respectively connected to the source pattern and the ground pattern of the circuit board 3 in the casing 2. An annular peripheral ground face 212a surrounds a portion of the central pin 211 exposed to the exterior of the casing 2. The columnar ground pin 212 extends into the casing 2 from the edge of the peripheral ground face 212a. Thus, the connection face of a charging cable has a double-core structure that comes into contact with the exposed portion of the central pin 211 and the peripheral ground face 212a. The interior of the side segment 2a along which the central pin 211 and the ground pin 212 extend is filled or lined with a waterproof member 213, such as resin or an annular gasket, to prevent intrusion of moisture.

The ground pin 212 is connected to one end of a flat spring 35 inside the casing 2. The other end of the flat spring 35 is connected to the ground side (not shown) of the battery 8 and is soldered to the circuit board 3 with solder 34 to be grounded to the substrate. The flat spring 35 and the ground pin 212 are stably connected to each other through engagement. Alternatively, these may be fixed to each other with a screw.

The central pin 211, the peripheral ground face 212a, the ground pin 212, and the flat spring 35 are composed of a material having high electric conductivity (low resistance) or plated with gold, for example, to reduce loss during charging.

The annular peripheral ground face 212a has an outward extension to avoid contact of the connector of the charging cable with the conductive member 24 when the connector is connected to the charging terminal 21. The extension is connected and fixed to the conductive member 24.

In this way, the ground edge 42 of the antenna element 4 is grounded to the substrate via the metal member 22, the conductive member 24, the ground pin 212 of the charging terminal 21, and the flat spring 35 (hereinafter these components are also collectively referred to as ground terminals 22, 24, 212, and 35).

The wireless device 1 can appropriately discharge static electricity by grounding the antenna element 4 at a position other than the feeding point. In particular, the wireless device 1 used as a wearable terminal is readily charged with static electricity. Thus, the influence of static electricity can be reduced by grounding the antenna element 4 to the substrate.

As described above, the wireless device 1 according to this embodiment includes a circuit board 3; a communicator 31 disposed on the circuit board 3; a casing 2 accommodating the circuit board 3 and the communicator 31 and having a through-hole in a side face; an antenna element 4 disposed on the exterior of the casing 2; a feeder 41 extending through the through-hole in the casing 2 and feeding electrical power from the communicator 31 to the antenna element 4 at a predetermined feeding position at one end of the antenna element 4; and ground terminals 22, 24, 212, and 35 extending through the through-hole in the casing 2 and electrically connecting a ground edge 42 disposed on the antenna element 4 at a predetermined distance from the feeding position to the circuit board 3.

Grounding the antenna element 4 to the substrates prevents charging of the antenna element 4. Thus, the influence of static electricity on received radio waves and the risk of damage to internal circuits due to static electricity can be reduced, even if the antenna element 4 is disposed on the exterior of the casing 2.

The antenna element 4 is connected to the circuit board 3 through the casing 2. Thus, the antenna element 4 can be grounded without too much detouring. This prevents an increase in resistance (impedance) of the grounding path and suppresses distortion of the received signals. Such a configuration can achieve more stable and satisfactory reception sensitivity. In particular, more stable reception sensitivity can be maintained under less influence of other factors, such as the contact state of the rear cover 2b and the body of the user, compared to a structure including only a grounding path through the rear cover 2b and the coil spring 37.

The ground terminals include a columnar ground pin 212 extending through the casing 2; and a metal member 22 and a conductive member 24 as a connector fixed to the ground pin 212 and electrically connecting the ground pin 212 to the ground edge 42. It is most preferred to ground the ground edge 42 to the substrate at the same position as the ground pin 212 through a minimum distance, for a reduction in resistive loss. However, such ideal positioning may be precluded due to the feeding position and the positional relationship between the ground edge 42 and other components, such as the push-button switches P1 and P2. In such a case, the ground edge 42 and the ground pin 212 can be connected to an appropriate connector to prevent an increase in resistive loss with a minimum increase in the grounding distance.

The ground pin 212 constitutes a ground voltage feeding path for the charging terminal 21 that charges the battery 8 feeding electrical power to the communicator 31. The antenna can be grounded to the substrate through an efficient and stable grounding path having low loss through a configuration relatively common to smart watches and having small resistance for efficient power supply, to maintain a satisfactory reception level of radio waves for stable reception of the radio waves.

This requires no additional holes in the casing 2 and thus no additional operation involving waterproofing of such holes. Thus, troublesome operations involving such holes and waterproofing can be avoided.

The ground terminals 22, 24, 212, and 35 are fixed and connect the antenna element 4 to the circuit board 3. In specific, such a stable connection, unlike an unstable connection by a spring, can prevent a variation in impedance, such as a temporary increase, due to the use state of the wireless device 1 or the moving state of the user, to maintain a satisfactory reception state.

At least part of the ground terminals 22, 24, 212, and 35 are fixed with screws 421, 241, and 242. The components disposed on the exterior of the casing 2 are removed for overhaul or maintenance. Thus, the antenna element 4 and the ground terminals (metal member 22) can be readily removed if necessary while the screws provide a stable connection between the antenna element 4 and the ground terminals during normal operation.

The wireless device 1 includes a waterproof structure for preventing the intrusion of moisture into the casing 2. In particular, the casing 2 has a simple structure having linear through-holes through which columnar pins, such as the feeding pin 411 and the ground pin 212, extend. This prevents gaps from remaining and readily maintains an appropriate waterproof structure.

The communicator 31 includes a satellite-wave receiver that receives radio waves from positioning satellites. The position of the ground edge 42 of the antenna element 4 is determined in accordance with the wavelength of the radio waves from the positioning satellites. In the case where a small wireless device that tends to have an unsatisfactory reception level is to receive radio waves from the positioning satellites, the antenna element 4 can be disposed on the exterior of the casing 2 to prevent attenuation of the radio waves, and the antenna element 4 can be appropriately grounded to prevent the influence of static electricity caused by charging of the antenna element 4. This prevents damage to the internal circuits and the wireless device 1 while maintaining a stable and satisfactory reception level of radio waves to acquire necessary information on position, date, and time.

The feeding pin 411 extends through the first through-hole, and the ground pin 212 extends through the second through-hole. The through-holes having small lengths are disposed at positions appropriate for the positions and positional relation of the feeding pin 411 and the ground pin 212, to achieve satisfactory power feeding to the antenna element 4 and grounding of the antenna element 4.

The present invention should not be limited to the embodiments described above and may include various modifications.

For example, in the embodiment described above, the antenna element 4 has an arcuate shape. Alternatively, the antenna element disposed on the exterior of the casing may have any shape, such as a flat shape. Alternatively, the antenna element may include an antenna path folded on a plane.

In the embodiment described above, electrical power is fed to one end of the antenna element 4, and the ground position is determined to be an appropriate distance from the feeding point in accordance with the reception wavelength. The feeding point may be disposed at any other position, and the ground position may be appropriately determined to be at any position where the reception state can be satisfactorily maintained.

In the embodiment described above, the communicator 31 receives radio waves from positioning satellites. Alternatively, the present invention maybe applied to ground an antenna element to a substrate, to receive and/or transmit other radio waves, such as radio waves for a wireless LAN.

In the embodiment described above, the antenna element 4 is grounded to the substrate via the metal member 22, the conductive member 24, the ground pin 212 of the charging terminal 21, and the flat spring 35. It is preferred to ground the antenna element 4 via less components because an increase in the number of components increases resistive loss mainly at the connecting areas. For example, the metal member 22 may be integrated with the conductive member 24.

The embodiment described above is achieved by the use of the ground pin 212 of the charging terminal 21 extending through the casing 2. Such a charging terminal is also included a conventional wireless device and can be applied to the present invention through a minor modification. In the case where the wireless device 1 includes no charging terminal 21, a new component extending through the casing 2 should be provided to ground the antenna element 4 to the substrate. It is preferred that the path extending through the casing 2 have a minimum length and is orthogonal to a side wall or side face of the casing. The path, however, may slightly divert from the orthogonal direction depending on the surface profile and the design of the side segment 2a. In this case also, it is preferred that the components be composed of or plated with a material having small resistance. The ground pin 212 and the other components extending through the casing 2 may have any shape besides a cylinder, for example a rectangular column. The components may also have a varying thickness, for example, a tapered shape.

In the embodiment described above, the feeding pin 411 and the ground pin 212 extend through two separate through-holes in the side segment 2a of the casing 2. Alternatively, a single through-hole may be shared depending on the positions of the components in the casing 2 and the signal patterns in the circuit board 3.

Alternatively, the sleeves of the push-button switches P1 and P2, which extend through the casing 2, may be used as ground pins. In such a case, satisfactory strength of the push-button switches P1 and P2 can be achieved through appropriate plating of portions of the sleeves and/or a double-core structure including a core having high electric conductivity and another core having high strength. The push-button switches P1 and P2 are connected to the circuit board 3 and the metal member 22 (ground edge 42) with leads and flexible plates such that shift due to the pressing operation of the push-button switches P1 and P2 does not cause a variation in resistance (impedance).

In the embodiment described above, the ground terminals are fixed with screws. Alternatively, the ground terminals may be fixed with any means at positions that do not interfere with assembly or disassembly of the wireless device.

In the embodiment described above, the antenna element 4 is grounded to the substrate via the charging terminal 21 and the rear cover 2b is grounded to the substrate via the coil spring 37. The latter grounding may be omitted.

In the embodiment described above, the wireless device 1 has a waterproof structure. Alternatively, the wireless device 1 may not have a waterproof structure. The casing 2 does not necessarily have to include a side segment 2a and a rear cover 2b. The casing 2 may integrate the side segment 2a and the rear cover 2b in a wireless device 1 that does not require exposure of the interior of the casing 2 from the rear side.

In the embodiment described above, the wireless device 1 is exemplified by a smart watch. Alternatively, the present invention may be applied to other wireless communication devices (wireless receivers), such as activity monitors and GPS loggers.

The detailed configuration and structure of the components of the embodiments described above maybe appropriately modified without departing from the scope of the present invention.

Though several embodiments of the present invention have been described above, the scope of the present invention is not limited to the above embodiments, and includes the scope of inventions, which is described in the scope of claims, and the scope equivalent thereof.

What is claimed is:

1. A wireless device comprising:
   a circuit board;
   a communicator disposed on the circuit board;
   a casing accommodating the circuit board and the communicator and having a through-hole in a side face;
   an antenna element disposed on the exterior of the casing;
   a feeder extending through the through-hole in the casing and feeding electrical power from the communicator to the antenna element at a predetermined feeding position; and
   a ground terminal extending through the through-hole in the casing and electrically connecting the circuit board to the antenna element at a ground position of the antenna element at a predetermined distance from the feeding position.

2. The wireless device according to claim 1, wherein, the ground terminal comprises:
   a columnar ground pin extending through the casing; and
   a connector fixed to the columnar ground pin and electrically connecting the columnar ground pin to the antenna element at the ground position.

3. The wireless device according to claim 2, wherein the columnar ground pin constitutes a ground voltage feeding path of a charging terminal charging a battery feeding electrical power to the communicator.

4. The wireless device according to claim 1, wherein the ground terminal is fixed and connects the circuit board to the antenna element.

5. The wireless device according to claim 4, wherein at least part of the ground terminal is fixed with a screw.

6. The wireless device according to claim 1, further comprising:
   a waterproof structure preventing intrusion of moisture into the casing.

7. The wireless device according to claim 1, wherein,
   the communicator comprises a satellite-wave receiver receiving radio waves from a positioning satellite, and
   the ground position of the antenna element is determined in accordance with the wavelength of the radio waves received from the positioning satellite.

8. The wireless device according to claim 1, wherein the through-hole comprises a first through-hole through which the feeder extends and a second through-hole through which the ground terminal extends.

\* \* \* \* \*